United States Patent
Yasuda

(10) Patent No.: US 9,402,020 B2
(45) Date of Patent: Jul. 26, 2016

(54) FOCUS DETECTION APPARATUS AND CONTROL METHOD FOR THE SAME

(71) Applicant: CANON KABUSHIKI KAISHA, Tokyo (JP)

(72) Inventor: Hitoshi Yasuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/076,567

(22) Filed: Nov. 11, 2013

(65) Prior Publication Data

US 2014/0139724 A1 May 22, 2014

(30) Foreign Application Priority Data

Nov. 16, 2012 (JP) .................................. 2012-252612

(51) Int. Cl.
  *H04N 5/232* (2006.01)
(52) U.S. Cl.
  CPC ....... *H04N 5/23212* (2013.01); *H04N 5/23219* (2013.01)
(58) Field of Classification Search
  CPC ................................................ H04N 5/23212
  USPC ......................................................... 348/345
  See application file for complete search history.

(56) References Cited

U.S. PATENT DOCUMENTS

| 2005/0270399 A1* | 12/2005 | Kawaguchi et al. ..... 348/333.11 |
| 2009/0244315 A1* | 10/2009 | Miura et al. ................ 348/222.1 |
| 2010/0097515 A1* | 4/2010 | Ishii .............................. 348/349 |
| 2012/0013786 A1* | 1/2012 | Yasuda et al. ................. 348/349 |

FOREIGN PATENT DOCUMENTS

| JP | 2002-251380 A | 9/2002 |
| JP | 2006-227080 A | 8/2006 |
| JP | 2009-211311 A | 9/2009 |

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

A focus detection apparatus detects a first subject region (e.g., face region) from an image signal, detects a second subject region (e.g., human body region), in which the first subject region can be estimated, from the image signal, and performs focus detection based on an image signal corresponding to the set focus detection area. In the case where the primary subject corresponds to the first subject region detected, the focus detection area is set to a first region, and, in the case where the primary subject corresponds to the first subject region estimated based on the second subject region, the focus detection area is set to a second region that is larger than the first region.

26 Claims, 11 Drawing Sheets

FOCUS DETECTION APPARATUS AND CONTROL METHOD FOR THE SAME

BACKGROUND OF THE INVENTION

1. Field of the Invention

The present invention relates to a focus detection apparatus and a control method for the same, and more particularly to a focus detection apparatus that sets a focus detection area to a specific subject region within an image and a control method for the same.

2. Description of the Related Art

In the autofocus (AF) control of video cameras and the like, a TV-AF system that detects an in-focus position based on the sharpness (contrast) of image signals generated using an image sensor is widely used. The TV-AF system, specifically, is a system that generates AF evaluation values indicating the degree of contrast for image signals picked up at different focus lens positions, and searches for a position of the focus lens at which contrast is maximized based on the AF evaluation values as an in-focus position.

Also, image pickup apparatuses having a function of detecting a specific subject in order to stably focus on a human subject in the case of picking up an image of a person are known. For example, an image pickup apparatus that performs focus detection after setting a focus detection area that includes a recognized face region has been proposed (Japanese Patent Laid-Open No. 2006-227080).

In the case of bringing a person's face into focus, focus detection is performed after setting a focus detection area that encompasses a detected face region, as shown in FIG. 8. When, however, a face region cannot be detected in the case of the person having his or her back turned or because of the person wearing a hat, holding a hand over their face, or the like, an appropriate focus detection area cannot be maintained.

SUMMARY OF THE INVENTION

The present invention enables stable focusing on a subject region with a focus detection apparatus that sets a focus detection area to a specific subject region within an image and a control method for the same.

According to an aspect of the present invention, there is provided a focus detection apparatus comprising: an image pickup unit configured to perform photoelectric conversion on a subject image to generate an image signal; a generation unit configured to generate a focusing signal from the image signal corresponding to a focus detection area; a first detection unit configured to detect a first subject region from the image signal; a second detection unit configured to detect a second subject region, in which the first subject region can be estimate, from the image signal; a setting unit configured to set the focus detection area according to a primary subject; and a control unit configured to perform focus detection based on the focusing signal, wherein the setting unit, in a case where the primary subject corresponds to the first subject region detected by the first detection unit, sets the focus detection area to the first region, and, in a case where the primary subject corresponds to the first subject region estimated based on the second subject region detected by the second detection unit, sets the focus detection area to a second region that is larger than the first region.

According to another aspect of the present invention, there is provided a method for controlling a focus detection apparatus, comprising: an image pickup step of performing photoelectric conversion on a subject image and generating an image signal; a generation step of generating a focusing signal from the image signal corresponding to a focus detection area; a first detection step of detecting a first subject region from the image signal; a second detection step of detecting a second subject region, in which the first subject region can be estimated, from the image signal; a setting step of setting the focus detection area according to a primary subject; and a control step of performing focus detection based on the focusing signal, wherein in the setting step, in a case where the primary subject is the first subject region detected in the first detection step, the focus detection area is set to the first region, and, in a case where the primary subject is the first subject region estimated based on the second subject region detected in the second detection step, the focus detection area is set to a second region that is larger than the first region.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Configuration of Image Pickup Apparatus

Hereinafter, a configuration in which a focus detection apparatus according to embodiments of the present invention is applied to an image pickup apparatus, and more particularly to a video camera, will be described. Note that the image pickup apparatus to which a focus detection apparatus according to the embodiments of the present invention is applicable is not limited to a video camera and may be a digital still camera. Also, a focus detection apparatus according to the embodiments of the present invention may also be applied to a device provided with an image pickup apparatus (e.g., personal computer, mobile phone, tablet, personal digital assistant, media player, etc.).

Figure 1:
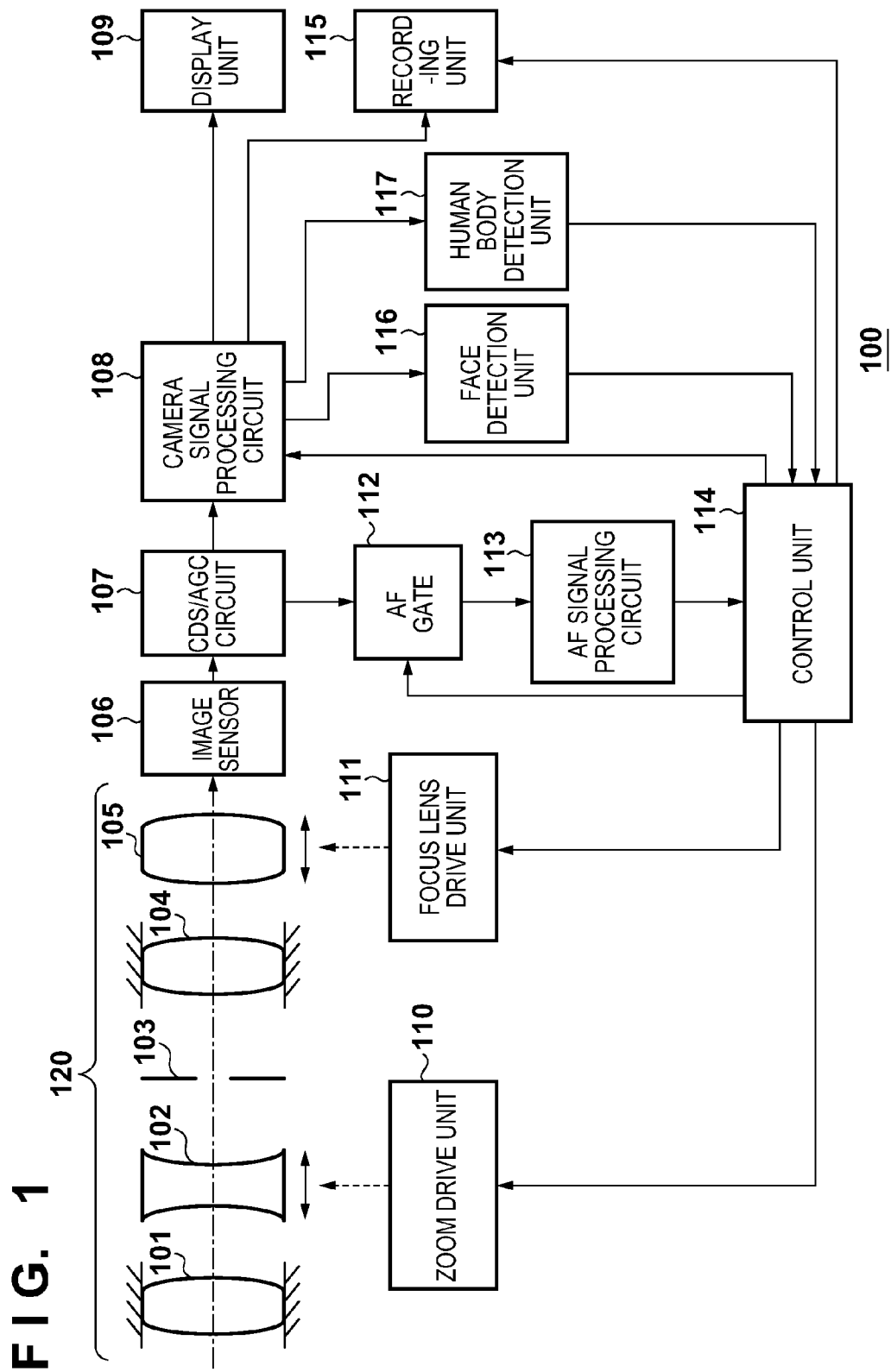
FIG. 1 is a block diagram showing a configuration of a principal portion of a video camera serving as an example of an image pickup apparatus to which a focus detection apparatus according to a first embodiment of the present invention is applied.

In FIG. 1, a digital video camera 100 of the present embodiment is provided with a lens unit 120 having an autofocus function as an image optical system. The lens unit 120 is provided with a first fixed lens 101, a variable magnification lens 102 that moves in an optical axis direction and performs variable magnification, a diaphragm 103, a second fixed lens 104, and a focus compensator lens 105. The focus compensator lens (hereinafter, simply "focus lens") 105 is provided with both a function of correcting movement of a focal plane following variable magnification and a focusing function.

An image sensor 106 is constituted by a photoelectric conversion element such as a CCD sensor or a CMOS sensor. The image sensor 106 picks up a subject image formed by the image optical system and outputs an image signal. A CDS/AGC circuit 107 performs correlated double sampling on the output of the image sensor 106 as well as gain adjustment.

A camera signal processing circuit 108 performs various types of image processing on the output signal from the CDS/AGC circuit 107 and generates an image signal. A display unit 109 is constituted by an LCD or the like, and displays the image signal from the camera signal processing circuit 108. A recording unit 115 records the image signal from the camera signal processing circuit 108 to a recording medium (magnetic tape, optical disc, semiconductor memory, etc.).

A zoom drive unit 110 moves the variable magnification lens 102 under the control of a control unit 114. A focus lens drive unit 111 moves the focus lens 105 under the control of the control unit 114. The zoom drive unit 110 and the focus lens drive unit 111 are constituted by actuators such as a stepping motor, a DC motor, a vibration motor, and a voice coil motor.

An AF gate 112 supplies only the signals of an area set by the control unit 114 for use in focus detection (focus detection area or AF frame), among the output signals of all the pixels from the CDS/AGC circuit 107, to a downstream AF signal processing circuit 113.

The AF signal processing circuit 113 extracts the component of a predetermined frequency band by applying a filter, for example, on signals within the focus detection area that are supplied from the AF gate 112, and generates AF evaluation values (focusing signals). The component extracted may be a high frequency component or a luminance difference component (difference between maximum and minimum luminance levels of signals passing through AF gate 112), for example.

The AF evaluation values are output to the control unit 114. The AF evaluation values are values representing the sharpness (degree of contrast) of an image that is generated based on the output signals from the image sensor 106, and can be utilized as a value representing the focusing state of the image optical system, because the sharpness of a focused image is high and the sharpness a blurred image is low.

The control unit 114 is a microcomputer, for example, and manages the overall operations of the digital video camera 100, by executing a control program prestored in a ROM not shown and controlling the constituent elements of the digital video camera 100. The control unit 114 controls the focus lens drive unit 111 and performs AF control processing with the TV-AF system (hereinafter, simply "TV-AF"), based on the AF evaluation values provided from the AF signal processing circuit 113.

A face detection unit 116 applies face detection processing that is based on well-known face detection technology to signals that are output by the CDS/AGC circuit 107, and detects a face region (first subject region) which is an example of a person region within an image. Well-known face detection technology includes learning-based techniques that utilize neural networks and the like, and techniques that search an image for sites that have characteristic shapes such as eyes, nose and mouth using template matching and regard a region having a high degree of similarity as a face. Another of the numerous techniques that have been proposed involves detecting the amount of image features such as skin color and eye shape and using statistical analysis. Generally a plurality of these techniques are combined to improve the accuracy of face detection. Specific examples include a method that performs face detection utilizing wavelet transforms and image feature amounts disclosed in Japanese Patent Laid-Open No. 2002-251380. Face detection processing by the face detection unit 116 is performed repeatedly every plurality of frames, but may be performed every frame.

The face detection unit 116 outputs, for each region detected as a person's face (face region), for example, information capable of specifying the position and size of the region within the image, the reliability of the detection result, and the like to the control unit 114 as a face detection result. The control unit 114 instructs the AF gate 112 to set the focus detection area to a region that includes the face region within the image, based on this face detection result.

Here, in the case where the faces of a plurality of persons are detected by the face detection unit 116, a primary face determination processing unit prioritizes the faces by position, size, or an instruction from the photographer. The face judged by the primary face determination processing unit to have the highest priority is taken as the primary face. For example, the determination is performed such that a face selected by an instruction from the photographer has the highest priority, and faces are more highly prioritized the closer the face to the middle of the screen and the larger the face. This determination is, however, not limited thereto.

A human body detection unit 117 performs well-known human body detection processing on the image signals, and detects human bodies (includes face and torso) within a picked up screen. The human body detection unit 117 outputs, for each region detected as a human body (human body region, second subject region), for example, information capable of specifying the position and size of the region within the image, the reliability of the detection result, and the like to the control unit 114 as human body detection results. The control unit 114 determines a final face region according to the human body detection results and the face detection results. Detection processing by the human body detection unit 117 is performed repeatedly every plurality of frames, but may be performed every frame.

While there is no particular restriction on the method of detecting human body regions by the human body detection unit 117, a method disclosed in Japanese Patent Laid-Open No. 2009-211311 can be used, for example. Specifically, local edge strengths of the outline of the upper body are detected as local feature amounts using filters such as a Sobel filter, a Prewitt filter or a Haar filter, and it is discriminated whether each person region is an upper body or a non-upper body from the extracted local feature amounts. This discrimination can be implemented based on machine learning such as AdaBoost learning. Note that, in Japanese Patent Laid- Open No. 2009-211311, description is given assuming the use of images picked up from diagonally above since images picked up by a surveillance camera are targeted, but the technology for detecting human body regions from outlines is not limited to images picked up from diagonally above.

Here, although the case is illustrated where the specific subject whose appearance can change depending on orientation is a person's face, and human body detection is used as another method of estimating the position of the person's face, the specific subject may be other arbitrary subjects including the animal faces. The present invention is applicable to arbitrary subjects with respect to which a first detection method that detects a region of a specific subject and a second detection method capable of estimating the position of a region of a specific subject can be utilized. The second detection method may be a method that detects a region encompassing a region to be detected with the first detection method, and more particularly detects a region in which the position of a region to be detected with the first detection method can be specified or estimated.

Also, the control unit 114, in order to provide the photographer with the information on the subject region detected by face detection, human body detection or the like, superimposes a subject region frame on the image signal displayed by the display unit 109, for example, through the camera signal processing circuit 108. The subject region frame is thereby displayed on the image in a superimposed manner, and the photographer can be made aware of the subject region that is detected by the digital video camera 100.

In the present embodiment, so as to be able to estimate the position of a person's face from a detected human body region, the human body detection unit 117 performs human body detection in a range encompassing the range in which the face detection unit 116 performs face detection.

AF Control Processing

Next, the AF control processing executed by the control unit 114 will be described using the flowcharts shown in FIGS. 2A and 2B.

This processing is executed in accordance with a computer program stored in the control unit 114, and is executed repeatedly at a readout period of the image signal from the image sensor 106 for generating 1 field image, for example.

First, at S201, the control unit 114 acquires the results of face detection processing executed on the most recent image signal from the face detection unit 116.

At S202, the control unit 114 acquires the results of human body detection processing executed on the most recent image signal from the human body detection unit 117.

Next, at S203, the control unit 114 determines whether the same subject has been detected, from the face detection results and the human body detection results acquired at S201 and S202. This processing will be discussed in detail later.

At S204, the control unit 114 determines whether a person's face or a human body has been detected, from the face detection results acquired at S201 and the human body detection results acquired at S202. The control unit 114 shifts the processing to S207 in the case where a person's face or a human body has been detected and to S205 in the case where neither a person's face nor a human body has been detected.

At S205, the control unit 114 sets an AF frame (focus detection area) to a predetermined fixed position (e.g., middle) within the picked up range, and notifies information on the AF frame to the AF gate 112. At S206, the control unit 114 then acquires an AF evaluation value generated from a signal that has passed through the AF gate 112. At S216, the control unit 114 executes TV-AF control that is based on AF evaluation values corresponding to the AF frame. The TV-AF control will be discussed in detail later.

At S207, the control unit 114 derives the number of detected human body regions from the human body detection results obtained from the human body detection unit 117. The control unit 114 then shifts the processing to S212, in the case where the number of detected human body regions is 0 or less than or equal to a count number discussed later (Yes at S208). Note that the count starts from 0.

On the other hand, in the case where the number of detected human body regions is greater than the count number discussed later (No at S208), the control unit 114 executes the processing from S209 onwards for the individual human body detection results.

At S209, the control unit 114 determines, from the processing result of S203, whether there is a face detection result relating to the same subject as the human body detection result targeted for processing. In the case where there is no face detection result that relates to the same subject (i.e., to which the same identification ID was assigned in S203) (No at S209), the control unit 114 performs face region estimation processing based on the human body detection result (S210). Thereafter, the control unit 114 shifts the processing to S211, increments the count number by one, and returns the processing to S208.

While there is no particular restriction on the method of estimating a face region from a human body detection result, in the case where, for example, an upper body or a human body shape from the chest up is detected as a human body region, it is possible to discriminate a head region from the shape of the human body region. Since the relationship between sizes or positions of the head region and the face region can be statistically derived in advance, being able to discriminate the head region enables the position and size of the face region to be estimated.

On the other hand, in the case where there is a face detection result that relates to the same subject (Yes at S209), the control unit 114 shifts the processing to S211, increments the count number by one, and returns the processing to S208. In this way, for each detected human body region, the position and size of a face region are estimated from the human body region, in the case where there is not a face detection result that relates to the same subject.

Next, the control unit 114 performs primary face determination processing at S212. Primary face determination is processing for setting a face region with the highest priority determined by face position, face size or an instruction from the photographer as the primary face (primary subject), with respect to face regions detected by the face detection unit 116 and regions equivalent to face regions estimated from human body regions. The primary face may be determined with faces being more highly prioritized the closer the face position is to the middle of the screen, or priorities may be set relative to a condition. For example, priorities may be determined such that a face selected by an instruction from the photographer has the highest priority, and faces are more highly prioritized the closer the face is to the middle of the screen and the larger the face. Also, face regions detected by the face detection unit 116 may be more highly prioritized than face regions estimated from human body regions.

At S213, the control unit 114 superimposes display showing the face region of the primary face determined at S212, such as frame display (face frame), for example, on the image signal that is displayed on the display unit 109. Note that face frame display may also be performed for face regions other than the primary face. In this case, the color, shape, display method or the like of face frame display for faces other than the primary face may be differentiated from the face frame display for the primary face. For example, a double face frame may be used for the face region set as the primary face, and a single face frame may be used for other face regions.

At S214, the control unit 114, in order to bring the primary face into focus, sets the AF frame based on the position of the primary face, acquires AF evaluation values from pixel information (e.g., luminance values) within the AF frame (focus detection area) (S215), and executes TV-AF control (S216). The method of setting the AF frame will be discussed in detail later using FIG. 5.

Note that TV-AF control processing combines the microstepping drive and the hill-climbing drive, and is a method that involves determining the increase or decrease in the AF evaluation value and searching for a focal point while driving the focus lens, such that the AF evaluation value is maximized. A conventionally known method can be used for actual TV-AF processing.

Next, the same subject determination processing of S203 in FIG. 2A will be described using the flowchart shown in FIG. 3.

At S301, the control unit 114 acquires the number of detected persons' faces from the face detection results obtained from the face detection unit 116. At S302, the control unit 114 then ends the processing, if the number of detected persons' faces is 0 or less than or equal to a count number discussed later (Yes). Note that the count is started from 0.

On the other hand, in the case where the number of detected persons' faces is greater than the count number discussed later (No at S302), the control unit 114 executes the processing from S303 onwards for each detected face region. At S303, the control unit 114 determines whether a human body region encompassing the face region targeted for processing is being detected.

In the case where a human body region encompassing the face region targeted for processing is being detected (Yes at S303), the control unit 114 determines that both regions relate to the same subject. The control unit 114 then shifts the processing to S305 after assigning the same identification ID at S304, with respect to the result of detecting a face region and a human body region that are determined to relate to the same subject. On the other hand, in the case where a human body region encompassing the face region is not being detected (No at S303), the control unit 114 shifts the processing to S305.

At S305, the control unit 114 increments the count number showing the number of processed face regions by one, and returns the processing to S302. After repeatedly executing the processing of S303 to S305 until the processing from S303 onwards has been performed for all the detected face regions, the control unit 114 ends the processing.

Accordingly, at S203, the control unit 114 is able to determine whether a face region and a human body region that relate to the same subject are being detected, by determining whether there is a detection result to which the same identification ID is assigned.

Figure 4A:
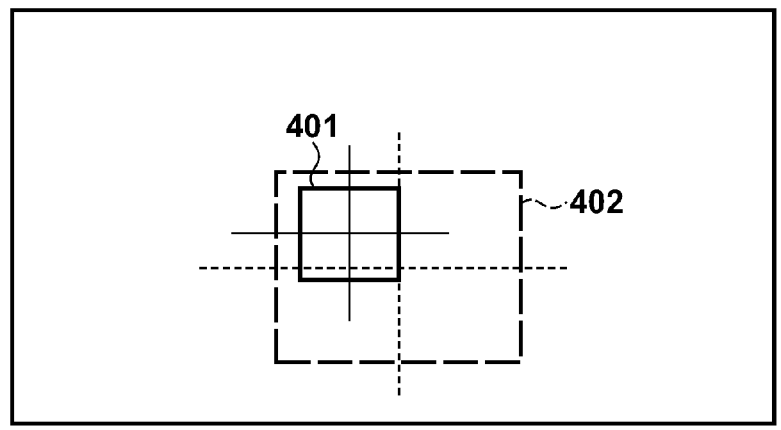
FIGS. 4A to 4C are diagrams showing a determination method of the same subject determination processing in the first embodiment of the present invention.
Figure 4B:
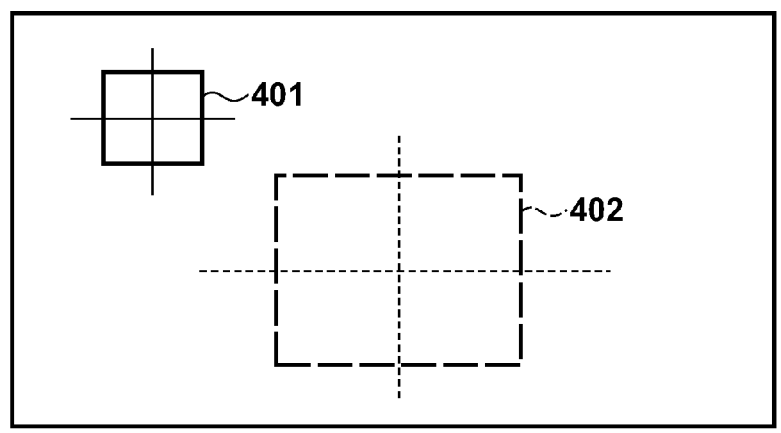
Figure 4C:
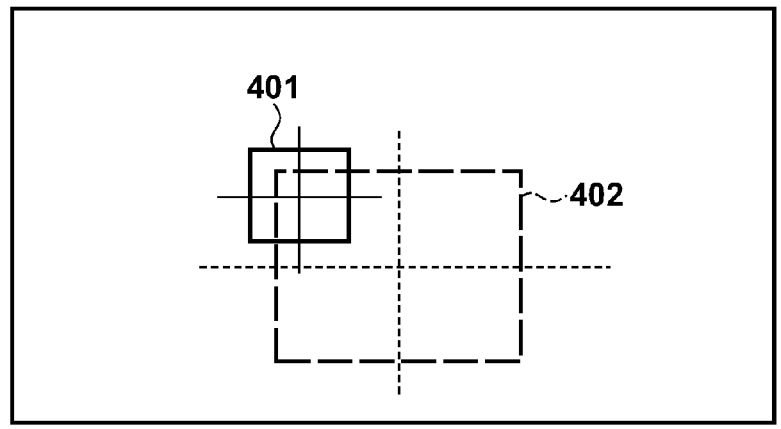

Note that the determination method in S303 will be further described using FIGS. 4A to 4C. In FIGS. 4A to 4C, the case where one each of a face region and a human body region are detected is shown, in order to facilitate description and understanding. FIG. 4A shows a state where a detected face region 401 is entirely encompassed in a human body region 402. FIG. 4B shows a state where the detected face region 401 is located at a distance from the human body region 402. FIG. 4C shows a state where the detected face region 401 is partially encompassed in the human body region 402.

In the present embodiment, in the case where a human body region encompassing a face region exists, it is determined that both regions relate to the same subject. Accordingly, among the positional relationships shown in FIGS. 4A to 4C, it is only determined that both regions relate to the same subject in the case of FIG. 4A where the entire face region 401 is included to the human body region 402.

Note that this determination method is merely an example, and determination is also possible by other standards. For example, even if there is not an encompassment relationship, a face region and a human body region that overlap by a predetermined percentage or more may be determined to relate to the same subject. The positional relationship between a face region (head region) estimated from the outline of a human body region and a detected face region can also be further taken into consideration. For example, in the case where the distance between the central coordinates of a head region estimated from the shape of a human body region and the central coordinates of a detected face region is less than a predetermined value, it can be determined that both regions relate to the same subject. An accurate determination is possible in this case.

Figure 5:
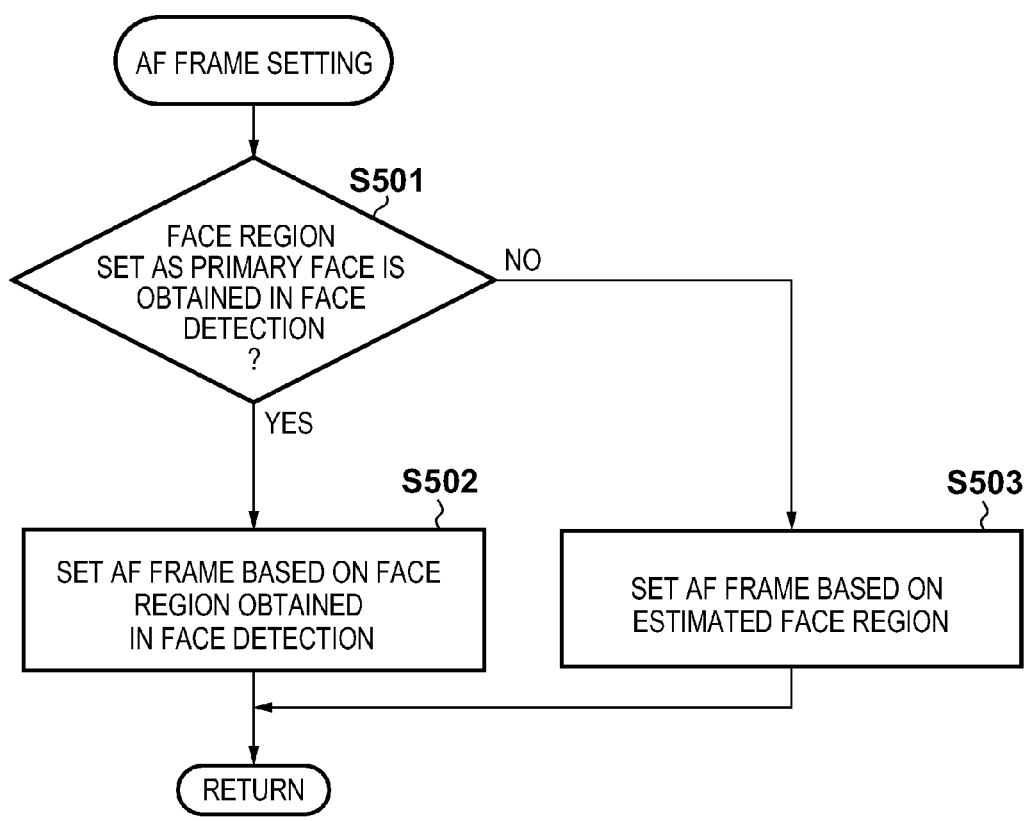
FIG. 5 is a flowchart showing processing for setting an AF frame for a primary face in the first embodiment of the present invention.

Next, the processing for setting the AF frame on the primary face performed at S214 of FIG. 2B will be described in detail using the flowchart shown in FIG. 5.

At S501, the control unit 114 determines whether the face region set as the primary face by the primary face determination processing of S212 is a face region detected by the face detection unit 116.

If the face region set as the primary face is a face region detected by the face detection unit 116, the control unit 114 advances the processing to S502. At S502, the control unit 114 sets the focus detection area (AF frame) based on the face region detected by the face detection unit 116. Here, the AF frame is set to size having a predetermined ratio "a" (first ratio) relative to the size of the detected face region. Note that, in the present embodiment, the predetermined ratio "a" is greater than or equal to 1, in order to set the AF frame so as to encompass the face region.

On the other hand, in the case where the face region set as the primary face is not a face region detected by the face detection unit 116 (i.e., it is a face region estimated from a human body region), the processing advances to S503. The control unit 114, at S503, sets the focus detection area (AF frame) based on the estimated face region. Here, the AF frame is set to a size having a predetermined ratio "b" (second ratio) relative to the size of the estimated face region. Here, the predetermined ratio "b" is greater than the predetermined ratio "a".

In the case where a face region estimated from a human body region is the primary face, there is no particular restriction on the method of setting the region to be used as the AF frame. However, a face region estimated from a human body region is generally considered to be less accurate than a face region detected by the face detection unit 116. Thus, in the case where the AF frame is set based on a face region estimated from a human body region, the ratio of the size of the AF frame relative to the size of the detected/estimated face region is increased in comparison to the case where the AF frame is set based on a face detection result. Even if the estimated face region is slightly displaced from the actual face region, the possibility that the in-focus position resulting from automatic focus detection will be an appropriate position can thereby be increased.

Also, since the orientation or posture of the person is not taken into consideration in the detection of a human body region, the estimated face region may actually be the back of the head rather than the face or may be displaced from the actual face region. Particularly when a portion having low contrast such as the back of the head is set as the AF frame, it may be difficult to realize stable focus detection with the TV-AF system which is based on contrast. Thus, in the case where the AF frame is set based on a face region estimated from a human body region, the contrast of the estimated face region may be further determined and the size of the AF frame may be changed. For example, in the case where the contrast of the estimated face region is less than a predetermined value (first value), the AF frame is set to a size of a predetermined ratio c (>predetermined ratio b) relative to the size of the face region. On the other hand, in the case where the contrast is greater than or equal to a predetermined value (second value), the AF frame is set to a size of the predetermined ratio b relative to the size of the face region. The contrast can be calculated based on the image signals (or the AF evaluation values) corresponding to the estimated face region, for example. This allows stable focus detection to be realized in the case where the contrast of the estimated face region is low, by setting an AF frame that is large enough to include the outline of the head. In actuality, the AF frame can be set, for example, by expanding the estimated face region peripherally by a predetermined percentage, or expanding the estimated face region such that the outline of the head is at least partially included in the AF frame, according to the accuracy with which the face region is estimated from the human body region. Alternatively, a rectangular area encompassing the human body region may simply be set as the AF frame.

Figure 12A:
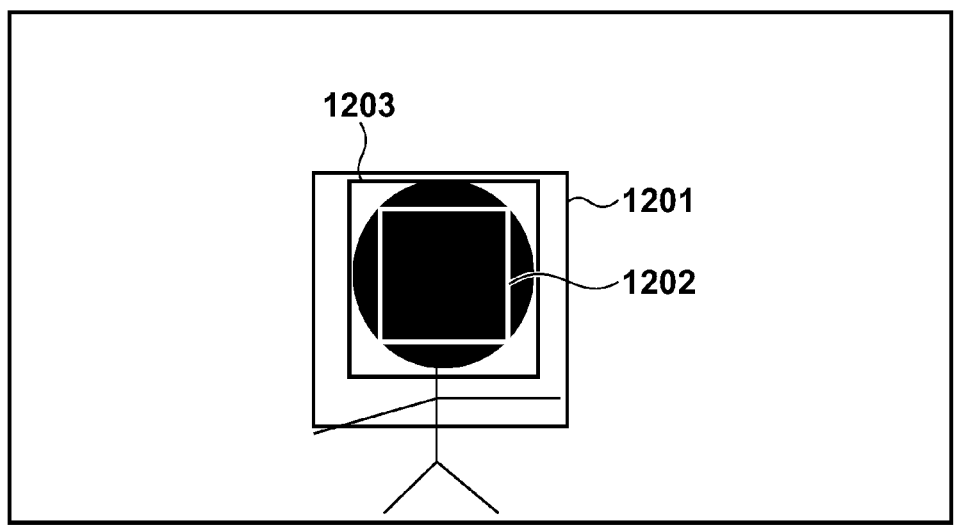
FIGS. 12A and 12B are diagrams schematically showing AF frames that are set according to an embodiment of the present invention.

FIG. 12A is a diagram schematically showing an example of the AF frame that is set in S503. In FIG. 12A, an estimated face region 1202 is a face region estimated based on a human body region 1201. Here, a case where an AF frame 1203 is set to a square area that encompasses the estimated face region 1202 and circumscribes the outline of the head is shown.

Figure 2A:
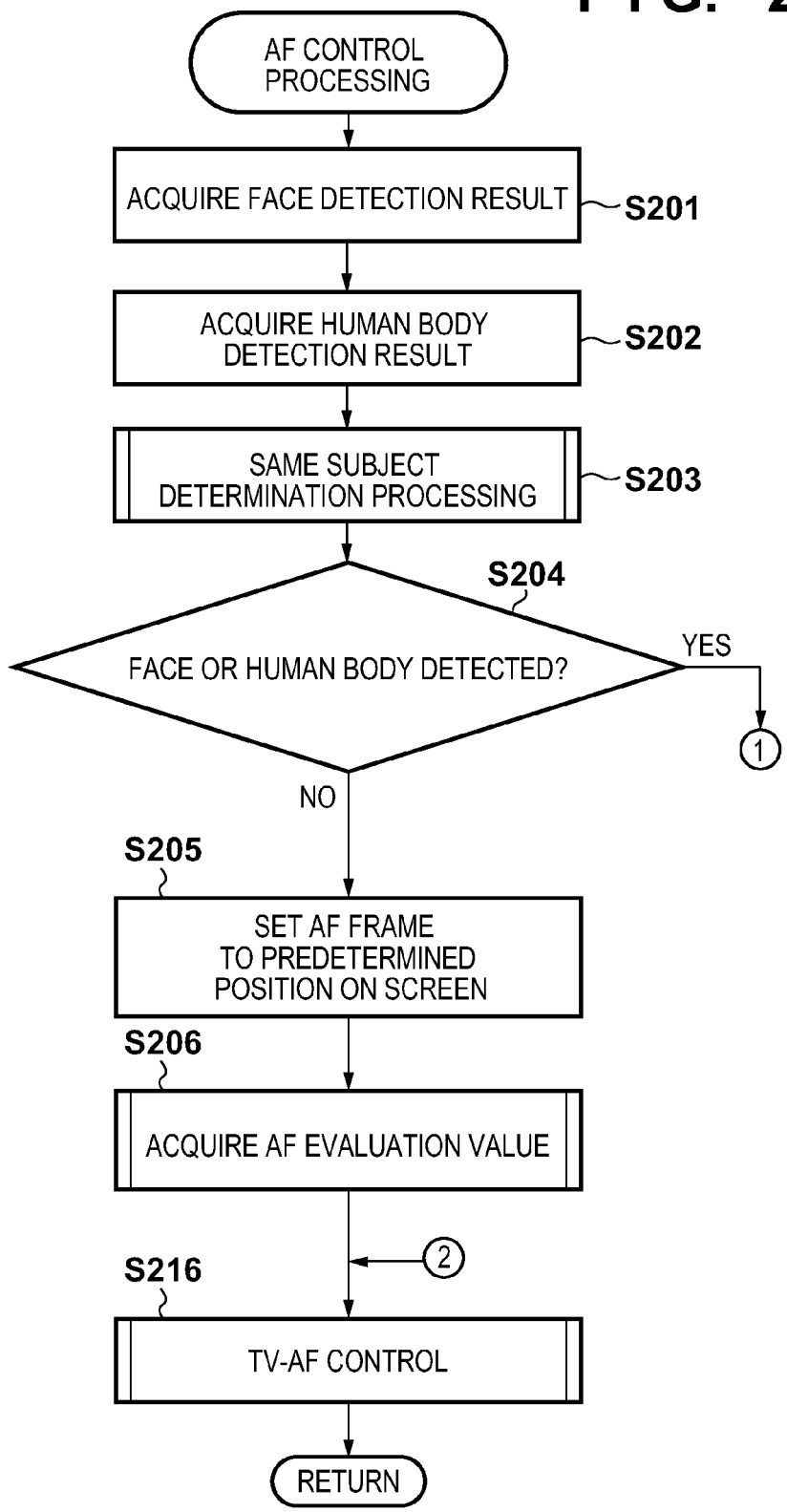
FIGS. 2A and 2B are flowcharts showing AF control processing in the first embodiment of the present invention.
Figure 2B:
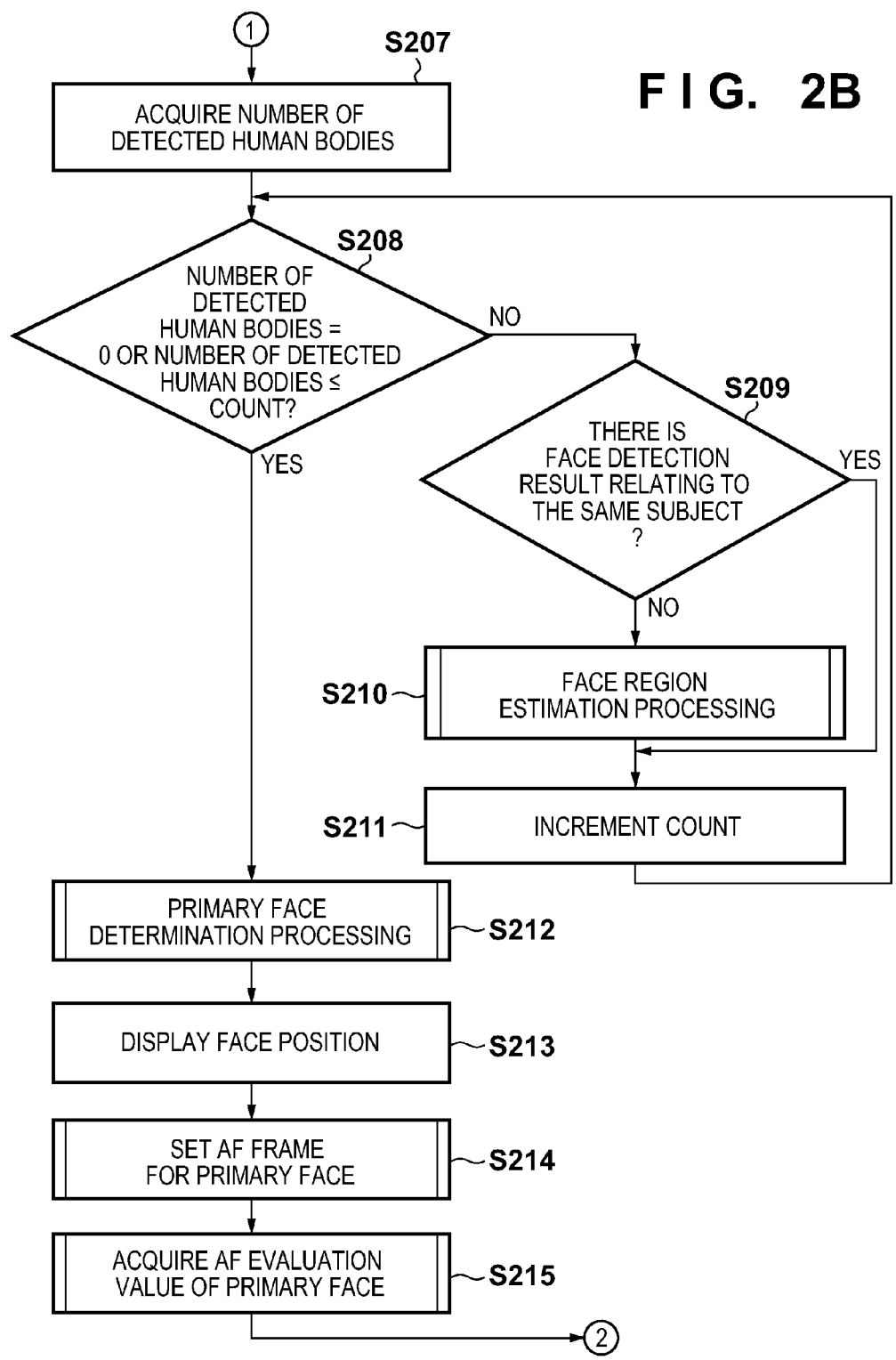
Figure 3:
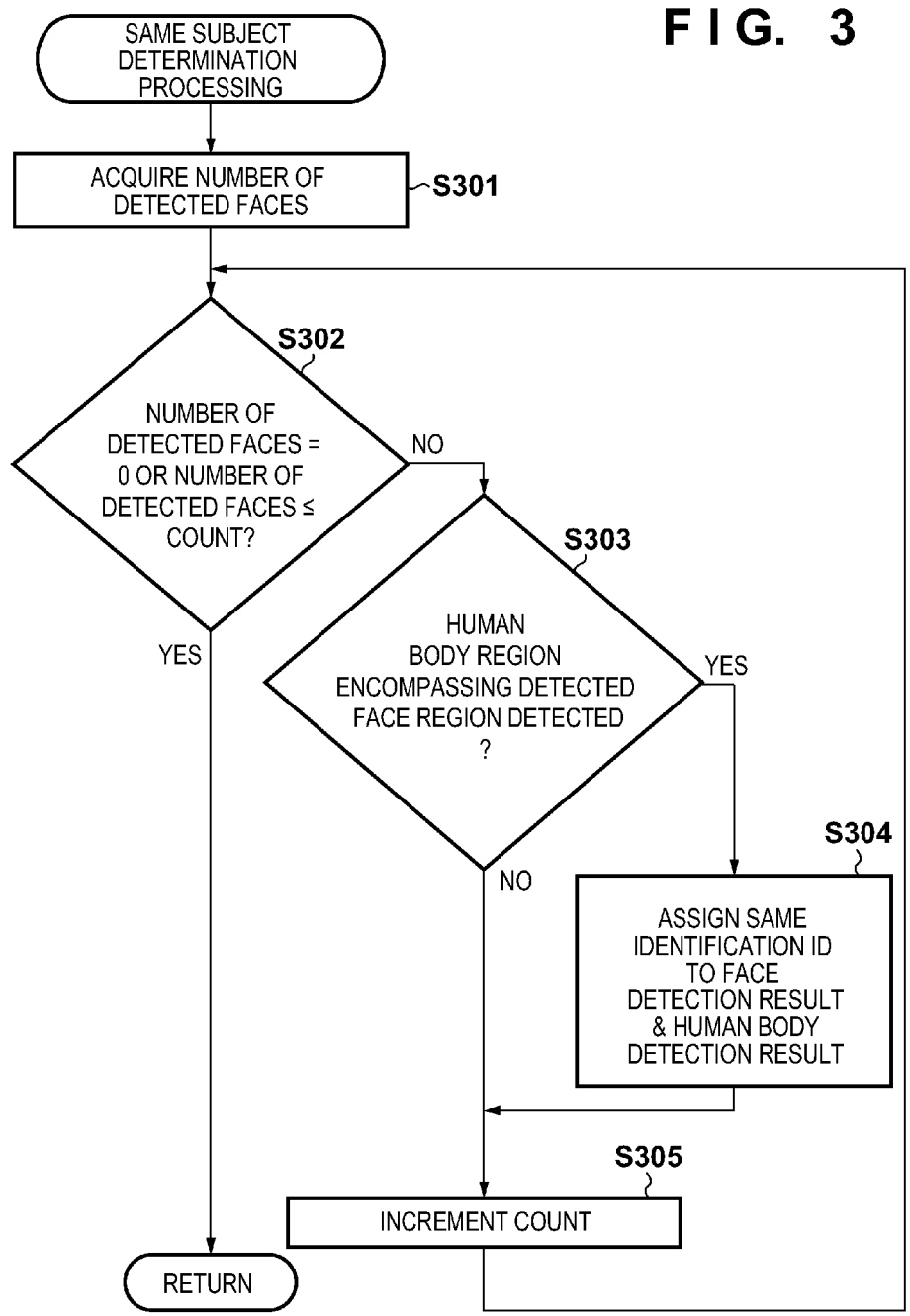
FIG. 3 is a flowchart showing same subject determination processing in the first embodiment of the present invention.
Figure 6:
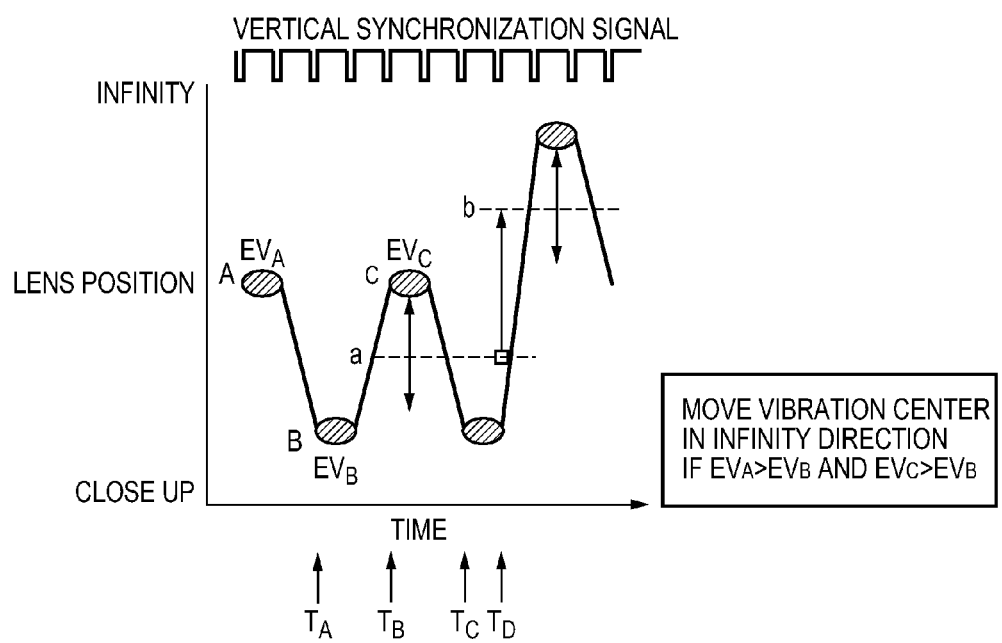
FIG. 6 is a diagram for illustrating a micro-stepping drive of a focus lens in TV-AF processing.

FIG. 6 is a diagram for illustrating the micro-stepping drive operation of the focus lens 105 that is executed in the TV-AF processing of S216 in FIG. 2A. In FIG. 6, the horizontal axis shows time and the vertical axis shows the position of the focus lens 105. Also, a vertical synchronization signal of the image signal is shown in the upper portion of the diagram. In the micro-stepping drive operation, the control unit 114 acquires AF evaluation values while moving the focus lens drive unit 111 in the infinity direction and the close up direction within a predetermined micro-stepping drive range. Processing such as determining the direction of the lens position in which the AF evaluation value increases and searching for the lens position (peak position) at which the AF evaluation value is maximized is then performed, by comparing the AF evaluation values acquired on the infinity side with the AF evaluation values acquired on the close up side.

Note that the control for performing the micro-stepping drive of the focus lens 105 in order to determine whether the lens is in an in-focus state from the change in AF evaluation values can also be called in-focus determination control. Also, the control for performing the micro-stepping drive of the focus lens 105 in order to determine the in-focus direction from the change in AF evaluation values can also be called in-focus direction discrimination control.

As shown in FIG. 6, an AF evaluation value $EV_A$ for electric charge (indicated with shaded ellipses in the diagram) accumulated in the image sensor 106 during a period A in which the lens has stopped on the infinity side is imported at time $T_A$. Also, an AF evaluation value $EV_B$ for electric charge accumulated in the image sensor 106 during a period B in which the lens has stopped on the close up side is imported at time $T_B$. Also, an AF evaluation value $EV_C$ for electric charge accumulated in the image sensor 106 during a period C in which the lens has again stopped on the infinity side is imported at time $T_C$.

The control unit 114 then compares the AF evaluation values $EV_A$, $EV_B$, and $EV_C$ at time $T_D$. If $EV_A > EV_B$ and $EV_C > EV_B$, the control unit 114 moves the drive (vibration) center of the micro-stepping drive a predetermined amount from a current position a in the direction in which the AF evaluation value increases (here, infinity direction) and sets the resultant position as b. On the other hand, if $EV_A < EV_B$ or $EV_B > EV_C$, the control unit 114 does not move the vibration center.

Next, the hill-climbing drive operation that is executed in combination with the micro-stepping drive operation in the TV-AF processing will be described using FIG. 7. When the in-focus direction has been discriminated by the micro-stepping drive operation, processing shifts to the hill-climbing drive operation.

Figure 7:
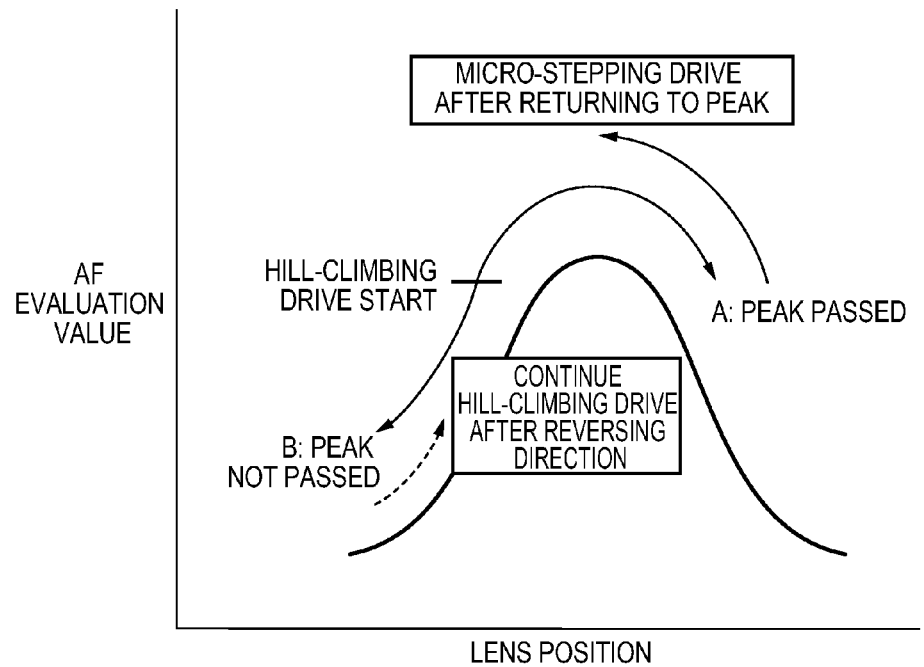
FIG. 7 is a diagram for illustrating a hill-climbing drive of the focus lens in TV-AF processing.
Figure 8:
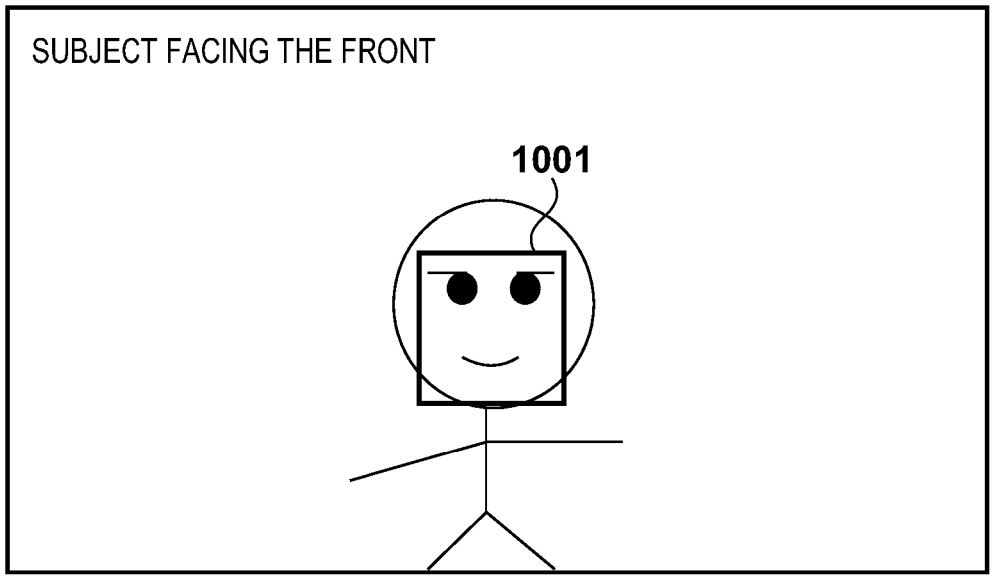
FIG. 8 is an illustrative diagram relating to the background art of the present invention.

FIG. 7 is a diagram showing an example of the size of the AF evaluation value during the hill-climbing drive operation and an exemplary drive operation of the focus lens 105. In the hill-climbing drive operation, the AF evaluation value is acquired while driving the focus lens 105, and the focus lens position (peak position) at which the obtained AF evaluation value peaks or a vicinity thereof is detected.

In FIG. 7, in the case where the focus lens 105 is driven toward the right side in the diagram from a start position of the hill-climbing drive, it is detected that the AF evaluation value is decreasing after passing the peak (maximum), as shown by an arrow A. In this case, the hill-climbing drive operation is ended since the focal point has been passed. The focus lens 105 is then returned to the position at which the maximum AF evaluation value was obtained, and the processing shifts to the abovementioned micro-stepping drive operation.

On the other hand, in the case where the focus lens 105 is driven to the left side in the diagram from the start position of the hill-climbing drive, it is detected that the AF evaluation value is decreasing without having peaked, as shown by an arrow B. In this case, it is judged that the focus lens 105 was moved in the wrong direction, and the hill-climbing drive operation is continued in the opposite direction. Note that in the hill-climbing drive, the amount of movement of the focus lens 105 per fixed period of time is greater than at the time of the abovementioned micro-stepping drive operation.

In this way, the control unit 114 executes an AF control operation for moving the focus lens 105 to a position at which the AF evaluation value is maximized, while repeatedly performing the following processing in order: reboot determination (determination as to whether to restart from the micro-stepping drive)→micro-stepping drive→hill-climbing drive→micro-stepping drive→reboot determination.

As described above, according to the present embodiment, a detection method for detecting the region of a specific subject (subject region) can be used in together with a detection method capable of estimating the position of the subject region. It is thereby possible to stably set a focus detection area on the specific subject, even in the case where a subject region cannot be detected despite the specific subject existing.

Also, a larger focus detection area is set for an estimated subject region than in the case of setting the focus detection area for a detected subject region, with respect to a detected/estimated subject region. More stable focus detection can thereby be performed, even in the case where an estimated subject region is used.

Embodiment 2

Figure 9:
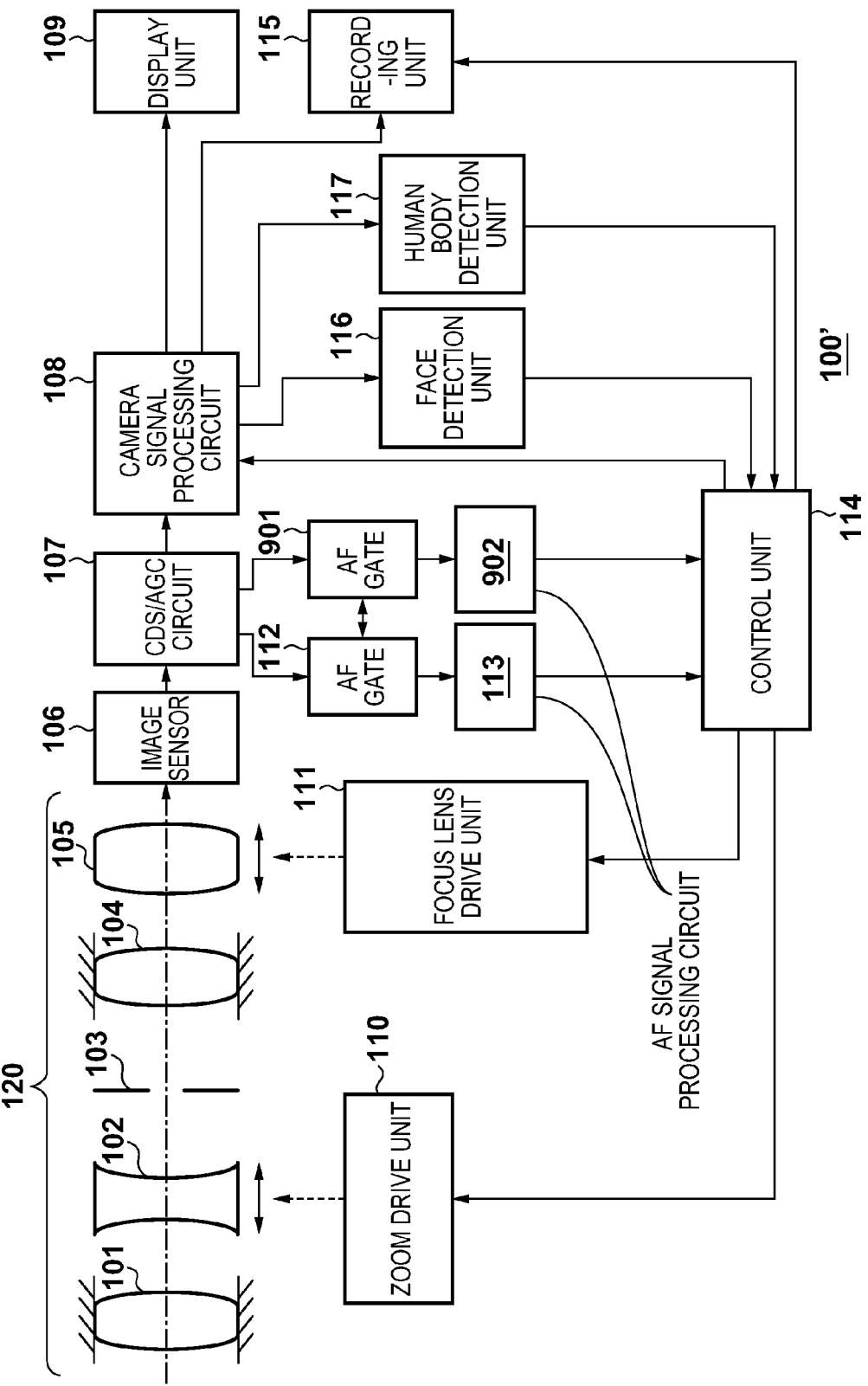
FIG. 9 is a block diagram showing a configuration of a principal portion of a video camera serving as an example of an image pickup apparatus to which a focus detection apparatus according to a second embodiment of the present invention is applied.

FIG. 9 is a block diagram showing an exemplary configuration of a digital video camera 100' as an example of an image pickup apparatus according to a second embodiment of the present invention. In FIG. 9 the same reference numerals are given to functional blocks that are the same as the first embodiment, and redundant description will be omitted. In the present embodiment, an AF gate 901 and an AF signal processing circuit 902 are added to the configuration of the first embodiment. Also, the AF frame setting processing of S214 and the AF evaluation value acquisition processing of S215 performed by the digital video camera 100' of the present embodiment differs from the AF control processing described in the first embodiment using FIGS. 2A and 2B. Accordingly, the AF frame setting processing and the AF evaluation value acquisition processing in the present embodiment will now be described.

Figure 10:
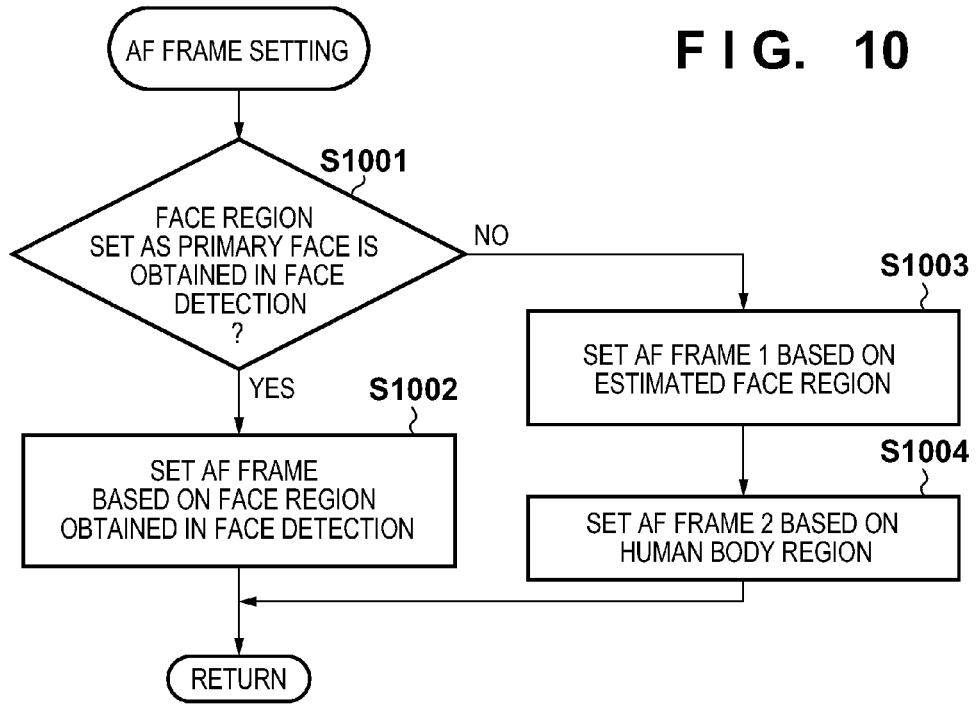
FIG. 10 is a flowchart showing processing for setting an AF frame in the second embodiment of the present invention.

First, the processing for setting an AF frame on the primary face in the present embodiment will be described using the flowchart shown in FIG. 10.

At S1001, the control unit 114 determines whether the face region set as the primary face by the primary face determination processing of S212 is a face region detected by the face detection unit 116.

If the face region set as the primary face is a face region detected by the face detection unit 116, the processing advances to S1002. At S1002, the control unit 114 sets the focus detection area (AF frame) based on the detected face region. Here, the AF frame is set to a size of a predetermined ratio a relative to the size of the detected face region. Note that, in the present embodiment, the predetermined ratio a is greater than or equal to 1:1, in order to set the AF frame so as to include the face region.

On the other hand, in the case where the face region set as the primary face is not a face region detected by the face detection unit 116 (i.e., it is a face region estimated from the human body region), the control unit 114 advances the processing to S1003. The control unit 114, at S1003, sets a first focus detection area (AF frame 1) based on the estimated face region. Although the AF frame 1 is set to a size of the predetermined ratio a relative to the size of the estimated face region in the present embodiment, the size of the AF frame 1 may be set to be larger than the predetermined ratio a. Also, the size of the AF frame 1 may be changed, according to the contrast of the estimated face region. In this case, for example, if the contrast within the estimated face region is less than a predetermined value, the AF frame 1 is set to be larger than in the case where the contrast is greater than or equal to the predetermined value.

Figure 12B:
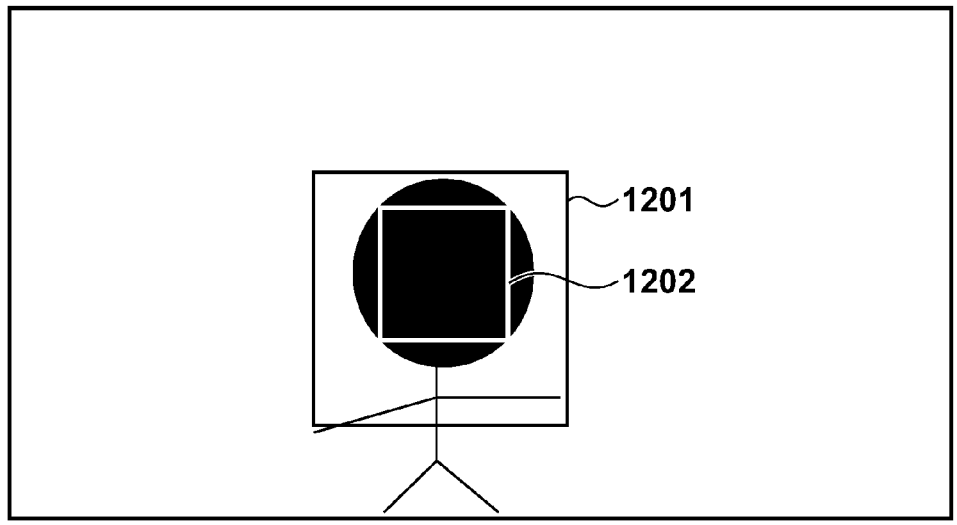

Furthermore, the control unit 114, at S1004, sets a second focus detection area (AF frame 2) based on the human body region. Here, the AF frame 2 is set to include the AF frame 1 and be larger than the AF frame 1. FIG. 12B schematically shows an example in which an AF frame 1_1202 based on the face region and an AF frame 2_1201 based on the human body region are set.

In this way, in the present embodiment, in the case where a face region estimated from a human body region is set as the primary face, an AF frame that corresponds to the estimated face region and an AF frame that corresponds to the human body region and is large enough to encompass the estimated face region are respectively set.

Figure 11:
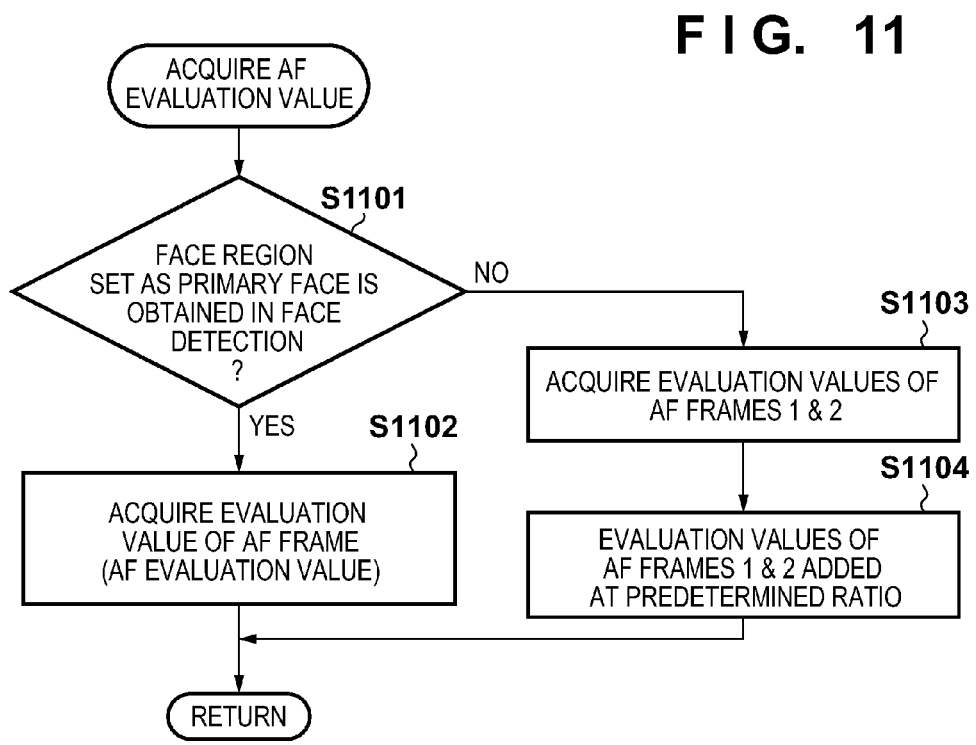
FIG. 11 is a flowchart showing AF evaluation value acquisition processing in the second embodiment of the present invention.

Next, the AF evaluation value acquisition processing in the present embodiment will be described using the flowchart shown in FIG. 11.

At S1101, the control unit 114 determines whether the face region set as the primary face by the primary face determination processing of S212 is a face region detected by the face detection unit 116. If the face region set as the primary face is a face region detected by the face detection unit 116, the control unit 114 advances the processing to S1102. At S1102, the control unit 114 acquires the AF evaluation value for the AF frame set at S1002, and ends the processing. In this case, there is one AF frame and the acquired AF evaluation value is directly used in the focus detection processing.

On the other hand, in the case where a face region estimated from a human body region is set as the primary face, the processing advances to S1103. The control unit 114, at S1103, acquires the AF evaluation values for both the AF frame 1 and the AF frame 2.

At S1104, the control unit 114 then adds the AF evaluation value (first focusing signal) for the AF frame 1 to the AF evaluation value (second focusing signal) for the AF frame 2 at a predetermined ratio to obtain an AF evaluation value that is used in the focus detection processing.

The predetermined ratio is set such that the ratio of the AF evaluation value for the AF frame 1 is greater than the ratio of the AF evaluation value for the AF frame 2. By setting such a ratio, focus detection that mainly depends on the increase or decrease in the AF evaluation value of the AF frame 1 will be performed if there is contrast in the image within the AF frame 1. On the other hand, in the case where the estimated face region is displaced from the actual face region or the image within the AF frame 1 has low contrast such as when the subject has his or her back turned, focus detection depending on the increase or decrease in the AF evaluation value of the AF frame 2 is performed. Thus, stable focus detection can be realized.

Furthermore, the predetermined ratio may be changed, based on the contrast within the AF frame 1. For example, in the case where the contrast within the AF frame 1 is greater than or equal to a predetermined value (is a third value), the ratio for adding the AF evaluation value for the AF frame 1 is increased in comparison to the case where the contrast is less than the predetermined value (is a fourth value). In the case where sufficient contrast is thereby obtained in the estimated face region, focus detection that depends more on the face region can be performed, enabling highly accurate focus detection.

According to the present embodiment, in the case where a face region estimated from a human body region is set as the primary face, AF frames corresponding to both the human body region and the estimated face region are set, and AF evaluation values acquired in both AF frames are used after being added together at a predetermined ratio. Thus, in addition to the effects of the first embodiment, highly accurate focus detection that is based on a face region can be realized in the case where adequate focus detection is possible with an estimated face region, and stable focus detection that is based on the AF evaluation value of a large AF frame can be realized in the case where the contrast of the face region is low.

Other Embodiments

Aspects of the present invention can also be realized by a computer of a system or apparatus (or apparatuses such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252612, filed on Nov. 16, 2012, which is hereby incorporated by reference herein in its entirety.

What is claimed is:

1. A focus detection apparatus comprising:
an image pickup unit configured to perform photoelectric conversion on a subject image to generate an image signal;
a generation unit configured to generate a focusing signal from the image signal corresponding to a focus detection area;
a first detection unit configured to detect a first subject region from the image signal;
a second detection unit configured to detect a second subject region, in which the first subject region can be estimated, from the image signal;
a setting unit configured to set the focus detection area according to a primary subject; and
a control unit configured to perform focus detection based on the focusing signal,
wherein the setting unit, in a case where the primary subject corresponds to the first subject region detected by the first detection unit, sets the focus detection area to a size having a first ratio relative to a size of the first subject region detected by the first detection unit, and, in a case where the primary subject corresponds to the first subject region estimated based on the second subject region detected by the second detection unit, sets the focus detection area to a size having a second ratio that is greater than the first ratio relative to a size of the first subject region estimated based on the second subject region detected by the second detection unit.

2. The focus detection apparatus according to claim 1, wherein the setting unit, in a case where the primary subject corresponds to the first subject region estimated based on the second subject region, sets the focus detection area to a region encompassing the first subject region.

3. The focus detection apparatus according to claim 1, wherein the first subject region is a region corresponding to a face of a person, and the second subject region is a region including a face and a torso of a person.

4. The focus detection apparatus according to claim 1, wherein the setting unit, in a case where the primary subject corresponds to the first subject region estimated based on the second subject region, changes a size of the focus detection area according to a contrast of the image signal corresponding to the first subject region.

5. The focus detection apparatus according to claim 4, wherein the setting unit, in a case where a contrast of the image signal corresponding to the first subject region estimated based on the second subject region is a first value that is smaller than a predetermined value, sets the focus detection area to be larger than in a case where the contrast is a second value that is larger than the predetermined value.

6. An electronic apparatus comprising the focus detection apparatus according to claim 1.

7. The electronic apparatus according to claim 6 is an image pickup apparatus.

8. The focus detection apparatus according to claim 1, wherein the setting unit, in a case where the primary subject corresponds to the first subject region estimated based on the second subject region, sets a first focus detection area based on the first subject region, and sets a second focus detection area that is larger than the first focus detection area, based on the second subject region.

9. The focus detection apparatus according to claim 8, wherein the setting unit sets the second focus detection area so as to encompass the first focus detection area.

10. The focus detection apparatus according to claim 8, wherein the control unit performs focus detection based on a focusing signal obtained by adding a first focusing signal corresponding to the first focus detection area to a second focusing signal corresponding to the second focus detection area at a predetermined ratio.

11. The focus detection apparatus according to claim 10, wherein the predetermined ratio is set such that a ratio for adding the first focusing signal is larger than a ratio for adding the second focusing signal.

12. The focus detection apparatus according to claim 10, wherein the predetermined ratio, in a case where a contrast of the image signal corresponding to the first focus detection area is a third value, is set such that a ratio for adding the first focusing signal is larger than in a case where the contrast is a fourth value that is smaller than the third value.

13. A method for controlling a focus detection apparatus, comprising:
an image pickup step of performing photoelectric conversion on a subject image and generating an image signal;
a generation step of generating a focusing signal from the image signal corresponding to a focus detection area;
a first detection step of detecting a first subject region from the image signal;
a second detection step of detecting a second subject region, in which the first subject region can be estimated, from the image signal;
a setting step of setting the focus detection area according to a primary subject; and
a control step of performing focus detection based on the focusing signal,
wherein in the setting step, in a case where the primary subject corresponds to the first subject region detected in the first detection step, the focus detection area is set to a size having a first ratio relative to a size of the first subject region detected in the first detection step, and, in a case where the primary subject corresponds to the first subject region estimated based on the second subject region detected in the second detection step, the focus detection area is set to a size having a second ratio that is greater than the first ratio relative to a size of the first subject region estimated based on the second subject region detected in the second detection step.

14. A non-transitory computer-readable storage medium storing a program for causing a computer to execute a method for controlling a focus detection apparatus, comprising:
an image pickup step of performing photoelectric conversion on a subject image and generating an image signal;
a generation step of generating a focusing signal from the image signal corresponding to a focus detection area;
a first detection step of detecting a first subject region from the image signal;
a second detection step of detecting a second subject region, in which the first subject region can be estimated, from the image signal;

a setting step of setting the focus detection area according to a primary subject; and a control step of performing focus detection based on the focusing signal, wherein in the setting step, in a case where the primary subject corresponds to the first subject region detected in the first detection step, the focus detection area is set to a size having_a first ratio relative to a size of the first subject region detected in the first detection step, and, in a case where the primary subject corresponds to the first subject region estimated based on the second subject region detected in the second detection step, the focus detection area is set to a size having a second ratio that is greater than the first ratio relative to a size of the first subject region estimated based on the second subject region detected in the second detection step.

15. A focus detection apparatus comprising:

an image sensor configured to perform photoelectric conversion on a subject image to generate an image signal; and a microcomputer configured to:
generate a focusing signal from the image signal corresponding to a focus detection area;
detect a first subject region from the image signal;
detect a second subject region, in which the first subject region can be estimated, from the image signal;
set the focus detection area according to a primary subject; and
perform focus detection based on the focusing signal, wherein, in a case where the primary subject corresponds to the first subject region detected from the image signal, the microcomputer sets the focus detection area to a size having a first ratio relative to a size of the first subject region detected from the image signal, and, in a case where the primary subject corresponds to the first subject region estimated based on the second subject region detected from the image signal, the microcomputer sets the focus detection area to a size having a second ratio that is greater than the first ratio relative to a size of the first subject region estimated based on the second subject region detected from the image signal.

16. The focus detection apparatus according to claim 15, wherein in a case where the primary subject corresponds to the first subject region estimated based on the second subject region, the microcomputer sets the focus detection area to a region encompassing the first subject region.

17. The focus detection apparatus according to claim 15, wherein the first subject region is a region corresponding to a face of a person, and the second subject region is a region including a face and a torso of a person.

18. The focus detection apparatus according to claim 15, wherein in a case where the primary subject corresponds to the first subject region estimated based on the second subject region, the microcomputer changes a size of the focus detection area according to a contrast of the image signal corresponding to the first subject region.

19. The focus detection apparatus according to claim 18, wherein in a case where a contrast of the image signal corresponding to the first subject region estimated based on the second subject region is a first value that is smaller than a predetermined value, the microcomputer sets the focus detection area to be larger than in a case where the contrast is a second value that is larger than the predetermined value.

20. An electronic apparatus comprising the focus detection apparatus according to claim 15.

21. The electronic apparatus according to claim 20 is an image pickup apparatus.

22. The focus detection apparatus according to claim 15, wherein in a case where the primary subject corresponds to the first subject region estimated based on the second subject region, the microcomputer sets a first focus detection area based on the first subject region, and sets a second focus detection area that is larger than the first focus detection area, based on the second subject region.

23. The focus detection apparatus according to claim 22, wherein the microcomputer sets the second focus detection area so as to encompass the first focus detection area.

24. The focus detection apparatus according to claim 22, wherein the microcomputer performs focus detection based on a focusing signal obtained by adding a first focusing signal corresponding to the first focus detection area to a second focusing signal corresponding to the second focus detection area at a predetermined ratio.

25. The focus detection apparatus according to claim 24, wherein the predetermined ratio is set such that a ratio for adding the first focusing signal is larger than a ratio for adding the second focusing signal.

26. The focus detection apparatus according to claim 24, wherein the predetermined ratio, in a case where a contrast of the image signal corresponding to the first focus detection area is a third value, is set such that a ratio for adding the first focusing signal is larger than in a case where the contrast is a fourth value that is smaller than the third value.

* * * * *